United States Patent [19]

Glance

[11] Patent Number: 4,723,317
[45] Date of Patent: Feb. 2, 1988

[54] OPTICAL HETERODYNE MIXERS PROVIDING IMAGE-FREQUENCY REJECTION

[75] Inventor: Bernard Glance, Colts Neck, N.J.

[73] Assignee: American Telephone and Telegraph Company, AT&T Bell Laboratories, Murray Hill, N.J.

[21] Appl. No.: 860,825

[22] Filed: May 8, 1986

[51] Int. Cl.⁴ .............................................. H04B 9/00
[52] U.S. Cl. .............................................. 455/619
[58] Field of Search ............... 455/609, 616, 617, 619; 370/2; 329/144; 356/349, 351

[56] References Cited

U.S. PATENT DOCUMENTS 3,215,840 11/1965 Buhrer ................................. 250/199
3,975,628 8/1976 Graves et al. ....................... 250/199

FOREIGN PATENT DOCUMENTS 59-122140 7/1984 Japan ................................. 370/2
60-172842 9/1985 Japan ................................. 455/619

OTHER PUBLICATIONS

Pratt, Laser Communications Systems, J. Wiley & Sons, 1969, pp. 38-40, 183-190, 224-231.
Saleh, Theory of Resistive Mixers, The MIT Press, pp. 168-169.
Wrixon, 8th European Microwave Conf., Paris, France, 4-8, Sep. 1978, pp. 717-719.
Bachus et al., Electronic Let., vol. 19, No. 17, 18, Aug., 1983, pp. 671-672.
Abbas et al., Globecom '83, San Diego, Calif, Nov. 28-Dec. 1, 1983, vol. 1, pp. 12.5.1-12.5.6.
Shikada et al., Trans. IECE Japan, vol. E67, No. 6, Jun. 1984, pp. 337-338.
Nicholson, Electronic Let., vol. 20, No. 24, Nov. 22, 1984, pp. 1005-1007.

*Primary Examiner*—Joseph A. Orsino, Jr.
*Attorney, Agent, or Firm*—Erwin W. Pfeifle

[57] ABSTRACT

The present invention relates to an optical heterodyne mixer providing image-frequency rejection which (a) detects a desired signal at frequency $f_{L.O.} \pm f_{IF}$ while rejecting interference from any signal at the image frequency $f_{L.O.} \mp f_{IF}$, and (b) provides performance which is insensitive to fluctuations in the optical dimensions of the circuit. More particularly, the mixer receives both a local oscillator input signal and a received input signal comprising one or more optical signals, one of the input signals being linearly polarized and the other being circularly polarized. The two signals are merged by an optical device and transmitted to a polarizing beam splitter which has its polarization axes oriented at 45 degrees to the polarization direction of the linearly polarized signal. Each of the two beams from the polarizing beam splitter is detected by a separate photodetector and the resulting two currents from the two photodetectors are added by means of a 3 dB 90 degree IF coupler. One of the coupler outputs provides the IF signal and the other coupler output provides the IF signal of the image frequency.

8 Claims, 5 Drawing Figures

4,723,317

OPTICAL HETERODYNE MIXERS PROVIDING IMAGE-FREQUENCY REJECTION

TECHNICAL FIELD

The present invention relates to optical heterodyne mixers and, more particularly, to optical heterodyne mixers which detect a desired frequency while rejecting interference from any signal at the image frequency and providing performance which is insensitive to fluctuations in the optical dimensions of the circuit.

DESCRIPTION OF THE PRIOR ART

Optical heterodyne mixers function to combine an incoming optical signal with an optical signal from a local laser to produce an output signal whose frequency is the frequency difference of the two optical signals. The simplest known optical mixer configuration is disclosed in, for example, the book "Laser Communication Systems" by W. K. Pratt, John Wiley & Sons, Inc., 1969, and is shown in FIG. 3. In the mixer of FIG. 3, a received optical signal from a remote source propagating along path 10, and an optical local oscillator signal propagating along path 11 impinge an optical beam-splitter 12. Each of the two optical outputs from beam-splitter 12 comprise both a component of the received signal and a component of the local oscillator signal from paths 10 and 11, respectively, which combined components propagate along paths 13 and 14. One of the two optical outputs from beam-splitter 12, which for purposes of illustration will be the output on path 13, is dirrected to a photodetector 15. Since the signals propagating along path 14 are wasted, only a fraction of both the received signal and the local oscillator signal is available for detection with this arrangement. Usually, the receiver sensitivity is maximized by using a beam-splitter which transmits most of the received signal. However, with such arrangement, most of the local oscillator signal is then wasted in the unused output of beam-splitter 12, and, therefore, a high power source is required for the local oscillator signal to obtain a receiver performance limited by quantum noise.

A more efficient mixer is provided by a balanced-mixer configuration shown in FIG. 4 and disclosed, for example, in the article by G. L. Abbes et al. in the *Globecom '83 Conference Record*, Vol. 1, San Diego, Calif., Nov. 28–Dec. 1, 1983, at pages 12.5.1–15.5.6. In FIG. 4, the basic elements 10–15 of FIG. 3 are shown and function as described hereinabove. The signals propagating along path 14, however, are redirected by a device 16 to a second photodetector 17. In such arrangement, the received signal and the local oscillator signal are both combined and then divided equally by beam-splitter 12 into first and second beams propagating along paths 13 and 14 which beams are directed to photodetectors 15 and 17, respectively. Addition of the currents provided by photodetectors 15 and 17 by a differential amplifier 18 yields a detected signal which is proportional to the available power in the two optical signals. Although the balanced mixer design uses all of the available power, it requires an additional photodetector 17 and a differential amplifier 18.

An Image Rejection Mixer (IRM) using a local oscillator (L.O.) signal of frequency $f_{L.O.}$ provides the means to detect simultaneously the two frequencies $f_{L.O.} - f_{IF1}$ and $f_{L.O.} + f_{IF2}$ and yields the two Intermediate Frequency (IF) signals of frequencies $f_{IF1}$ and $f_{IF2}$ in first and second outputs, respectively. An optical mixer having this feature is highly desirable for optical Local Area Network (LAN) applications and communication systems using Wavelength Division Multiplex (WDM) techniques. Implementation of an IRM is simple at microwave frequencies using, for example, the arrangement shown in FIG. 5, or image separation mixers as disclosed in the book "Theory Of Resistive Mixers" by A. A. M. Saleh, Cambridge MIT Press, 1971 at pages 168–169. In FIG. 5, the received signal is separated into two equal portions by a 3 dB High Frequency (HF) coupler 20 for propagation along separate paths 21 and 22. Individual mixers 23 and 24 combine a local oscillator signal with the received signal portions in paths 21 and 22, respectively, which signals are filtered by respective IF filters 25 and 26. A 3 dB IF coupler 27 functions to add the resulting signals on paths 21 and 22 with one coupler output providing the IF signal and the other output providing the IF signal at the image frequency. Unfortunately, transposition of this circuit to optical frequencies is impractical because the optical dimensions of the circuit must be adjusted to a small fraction of an optical wavelength.

U.S. Pat. No. 3,215,840 issued to C. F. Buhrer on Nov. 2, 1985, discloses an image rejection optical super-heterodyne receiver for receiving single-sideband signals and separating upper and lower sideband optical signals to separate outputs thereof. The Buhrer receiver uses four plane polarizers, a beam splitter, a quarter-wave plate for delaying one of the two orthogonally polarized signals passing therethrough by $\pi/2$ radians, and at least one photocell. Where only one photocell is used additional prisms are needed, while when two photocells are required, then an additional $\pi/2$ phase shifter and summing network is required. A significant fraction of the received optical signal is lost or wasted because of the polarizers and, therefore, the sensitivity of the receiver is decreased. The problem remaining in the prior art is to provide an optical image rejection heterodyne mixer which uses substantially all of the received signal and, thereby, provides excellent performance and simple design.

SUMARY OF THE INVENTION

The foregoing problem in the prior art has been solved in accordance with the present invention which relates to optical heterodyne mixers providing image-frequency rejection which comprise a beam-splitter for adding a received optical signal to an optical local oscillator signal. The merged beam then enters a polarizing beam-splitter which separates the two orthogonal polarization components of the merged beam. Each of the two exiting beams from the polarizing beam-splitter is detected separately by an associated photodetector. The resulting two IF currents are added by means of a 3 dB 90 degree IF coupler, where one of the coupler outputs provides the IF signal and the other output yields the IF signal of the image frequency. In the present mixers, the received optical signal(s) is linearly polarized at 45 degrees relative to the polarization axes of the polarizing beam-splitter, while the optical local oscillator signal is circularly polarized, or vice versa.

It is an aspect of the present invention to provide an optical heterodyne mixer providing image-frequency rejection which includes a 3 dB beam-splitter for both adding the two input signals and directing portions of the combined signals along a first and a second path, where one of the paths includes a 90 degree polarization rotator. Both paths from the beam-splitter arrive at a polarizing beam-splitter which directs first and second orthogonal polarization components from the first and second paths, respectively, to a first photodetector while the second and first orthogonal polarization components from the first and second paths, respectively, are directed to a second photodetector. The resulting IF currents from the first and second photodetectors are added by means of a 3 dB 90 degree IF coupler, with one of the coupler outputs providing the IF signal, while the other coupler output provides the IF signal of the image frequency. The received optical signal(s) is linearly polarized at 45 degrees to the polarization axes of the polarizing beam-splitter, while the optical local oscillator signal is circularly polarized, or vice versa.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
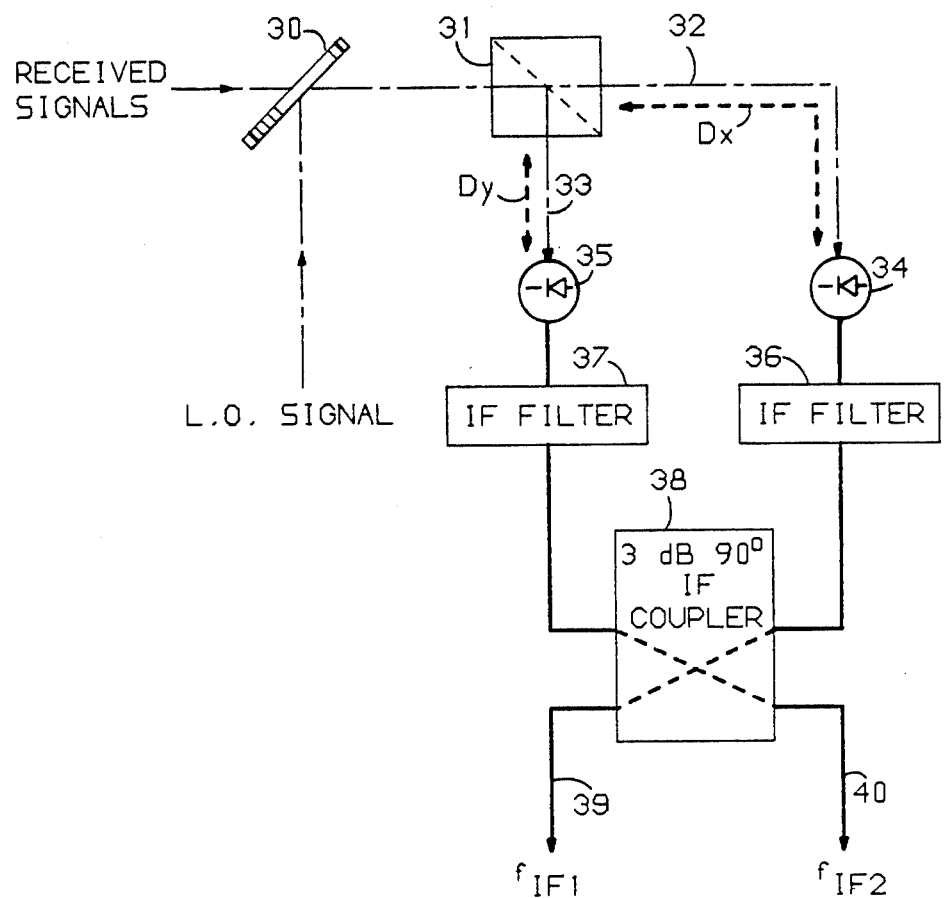
FIG. 1 is a diagram of an optical heterodyne mixer providing image-frequency rejection in accordance with the present invention.

An arrangement of an optical heterodyne mixer providing image-frequency rejection in accordance with the present invention is shown in FIG. 1. There, a received optical signal and an optical local oscillator (L.O.) signal are received at separate inputs and directed at a beam splitter 30 which adds the received signal to the L.O. signal. It is to be understood that one of the input signals, either the received signal or the L.O. signal, is linearly polarized, while the other input signal is circularly polarized. Additionally, it should be understood that the received signal can comprise one or more optical signals at different frequencies, where each optical carrier is modulated by a separate information signal.

The merged beam at the output of beam splitter 30 comprises components of both the received and the L.O. signals and enters a polarizing beam splitter 31 which functions to separate the horizontal and vertical polarization components of the merged beam. It is to be understood that polarizing beam splitter 31 should be oriented with its polarization axes at 45 degrees relative to the polarization direction of the input signal which is linearly polarized. Such orientation permits the power of the linearly polarized input signal to be equally divided between the transparent and reflective outputs of polarizing beam splitter 31, such that equal components of the linearly polarized input signal in the merged beam enter branches 32 and 33 at the output of beam splitter 31. It is to be understood that polarizing beam splitter 31 also causes equal components of the circularly polarized input signal in the merged beam to enter branches 32 and 33 concurrent with the above-mentioned components of the linearly polarized input signal. The arrangement of FIG. 1 provides the means to maintain the required phase relationships between the in-phase and quadrature signal components independently of the optical path dimensions of the circuit because the L.O. signal and the received signal follow the same optical paths.

Each of the two exiting beams, comprising components of both the linearly and circularly polarized input signals, in branches 32 and 33 is detected separately in photodetectors 34 and 35, respectively. The two resulting Intermediate Frequency (IF) currents from photodetectors 34 and 35 are separately filtered in optional IF filters 36 and 37, respectively, to pass only the IF frequencies, before being added by means of a 3 dB 90 degree IF coupler 38. One of the coupler outputs, e.g., output 39, provides, for example, the IF signal while the other output, e.g., output 40, provides, for example, the IF signal of the image frequency. Each of the output signals can then be processed by separate receivers as desired. It is to be understood that IF filters 36 and 37 may not be necessary when the received signal only comprises one optical signal, but may be necessary where more than one optical signal is included in the received signal.

To describe the mode of operation of the mixer quantitatively, it will be assumed that the L.O. signal is circularly polarized and given by $$E_{L.O.}(t) = (\sqrt{P_0'}\ \cos\omega_0 t)_x + (\sqrt{P_0'}\ \sin\omega_0 t)_y. \quad (1)$$

The quantity $P_0'$ represents the power supplied by the L.O. source; x denotes the polarization component which traverses the polarization beam splitter 31 and y denotes the orthogonal polarization component which is reflected by this device.

It will be further assumed that the received signal is composed of two components; one of radial frequency $\omega_1 < \omega_0$ and power $P_1$, the other of radial frequency $\omega_2 > \omega_0$ and power $P_2$. Being linearly polarized in a direction which divides equally their power between the x and y polarization components, these signals can be written as $$E_1(t) = (\sqrt{P_1}\ \cos\omega_1 t)_x + (\sqrt{P_1}\ \cos\omega_1 t)_y \quad (2)$$

and $$E_2(t) = (\sqrt{P_2}\ \cos\omega_2 t)_x + (\sqrt{P_2}\ \cos\omega_2 t)_y. \quad (3)$$

The beam splitter 30, used for adding the signals, is assumed to be lossless and nearly transparent to the received signals. Therefore, only a small fraction of the total L.O. power $P_0'$, denoted as $P_0$, is added to the signals given by Equations (2) and (3). The merged beam exiting the beam splitter 30 is thus given by $$E_m(t) = \{\sqrt{P_0}\ \cos(\omega_0 t + \theta_R) + \sqrt{P_1}\ \cos(\omega_1 t + \theta_T) + \quad (4)$$

$$\sqrt{P_2}\ \cos(\omega_2 t + \theta_T)\}_x + \{\sqrt{P_0}\ \sin(\omega_0 t\ \theta_R) +$$

-continued
$$\sqrt{P_1} \cos(\omega_1 t + \theta_T) + \sqrt{P_2} \cos(\omega_2 t + \theta_T)\}_y.$$

The quantities $\theta_T$ and $\theta_R$ represent phase shifts caused by beam splitter 30 and to satisfy energy conservation are related by $$\theta_T - \theta_R = \pi/2. \quad (5)$$

The x-polarization component traversing polarizing beam splitter 31 arrives at photodiode 34 with the value $$E_x(t) = \sqrt{P_0} \cos\left[\omega_0\left(t + \frac{L + D_x}{v}\right) + \theta_R + \theta_{T'}\right] + \quad (6)$$

$$\sqrt{P_1} \cos\left[\omega_1\left(t + \frac{L + D_x}{v}\right) + \theta_T + \theta_{T'}\right] +$$

$$\sqrt{P_2} \cos\left[\omega_2\left(t + \frac{L + D_x}{v}\right) + \theta_T + \theta_{T'}\right]$$

The y-polarization component, being reflected by polarizing beam splitter 31, reaches the second photodiode 35 with the value $$E_y(t) = \sqrt{P_0} \sin\left[\omega_0\left(t + \frac{L + D_y}{v}\right) + \theta_R + \theta_{R'}\right] + \quad (7)$$

$$\sqrt{P_1} \cos\left[\omega_1\left(t + \frac{L + D_y}{v}\right) + \theta_T + \theta_{R'}\right] +$$

$$\sqrt{P_2} \cos\left[\omega_2\left(t + \frac{L + D_y}{v}\right) + \theta_T + \theta_{R'}\right]$$

The optical phase velocity is given by v, and the quantity L represents the distance between the beam splitter and the point where two polarization components are separated. The phase shift introduced by L is thus the same for the two polarization components when the propagation medium is isotropic. The two other distances $D_x$ and $D_y$ represent the remaining path lengths for the beams given by Equations (6) and (7) to reach their respective photodiodes 34 and 35. The distances $D_x$ and $D_y$ are assumed to be nearly equal when measured relative to an IF wavelength but may differ by many optical wavelengths. The first of these two conditions is similarly required in a conventional IRM at microwave frequencies. The quantities $\theta_{T'}$ and $\theta_{R'}$ represent phase shifts caused by polarizing beam splitter 31.

After detection, where, $P_o$ is assumed to be much larger than $P_1$ and $P_2$, and IF filtering, the signals given by Equations (6) and (7) provide the respective IF currents $$I_x(t) = \frac{2\pi\eta e}{h\omega} \{\sqrt{P_0 P_1} \sin\Omega_1 t' - \sqrt{P_0 P_2} \sin\Omega_2 t'\} \quad (8)$$

and $$I_y(t) = \frac{2\pi\eta e}{h\omega} \{-\sqrt{P_0 P_1} \cos\Omega_1 t' - \sqrt{P_0 P_2} \cos\Omega_2 t'\} \quad (9)$$

where $\Omega_1$ and $\Omega_2$ are the two IF radial frequencies given by $$\Omega_1 = \omega_o - \omega_1 \quad (10)$$

and $$\Omega_2 = \omega_2 - \omega_o \quad (11)$$

the time t', given by $$t' = t + \frac{L + D_x}{v} \approx t + \frac{L + D_y}{v} \quad (12)$$

is nearly the same for the two beams when measured relative to an IF period since it is assumed that $$|D_x - D_y| \approx 2\pi v/\Omega_{1,2} \quad (13)$$

Note that the phases of the currents given by Equations (8) and (9) are insensitive to optical path length fluctuations even if $|D_x - D_y|$ varies by many optical wavelengths. Among the remaining parameters, e is the charge of an electron, h is Planck's constant and $\eta$ is the quantum efficiency of the photodiodes 34 and 35, assumed to be the same for the two diodes. When this condition is not satisfied, the difference between the $\eta$ values can be compensated by attenuating the stronger of the currents given in Equations (8) or (9) when $P_1$ or $P_2$ is equal to zero.

The last signal processing step consists of adding the currents given by the Equation (8) and (9) by means of a 3 dB 90 degree IF coupler 38 which is assumed to be lossless. Therefore, to satisfy energy conservation, the coupler 38 transforms the input currents into the output signals $$i_1(t) = \frac{1}{\sqrt{2}} \text{Real}\{I_x(t)e^{j\pi/2} + I_y(t)\} \quad (14)$$

and $$i_2(t) = \frac{1}{\sqrt{2}} \text{Real}\{I_x(t) + I_y(t)e^{j\pi/2}\} \quad (15)$$

The result yields $$i_1(t) = \frac{-2\pi\eta e}{h\omega} \sqrt{2P_0 P_2} \cos\Omega_2 t' \quad (16)$$

and $$i_2(t) = \frac{+2\pi\eta e}{h\omega} \sqrt{2P_0 P_1} \sin\Omega_1 t' \quad (17)$$

showing that the IF signals corresponding to the two received optical carriers can be recovered independently.

Figure 2:
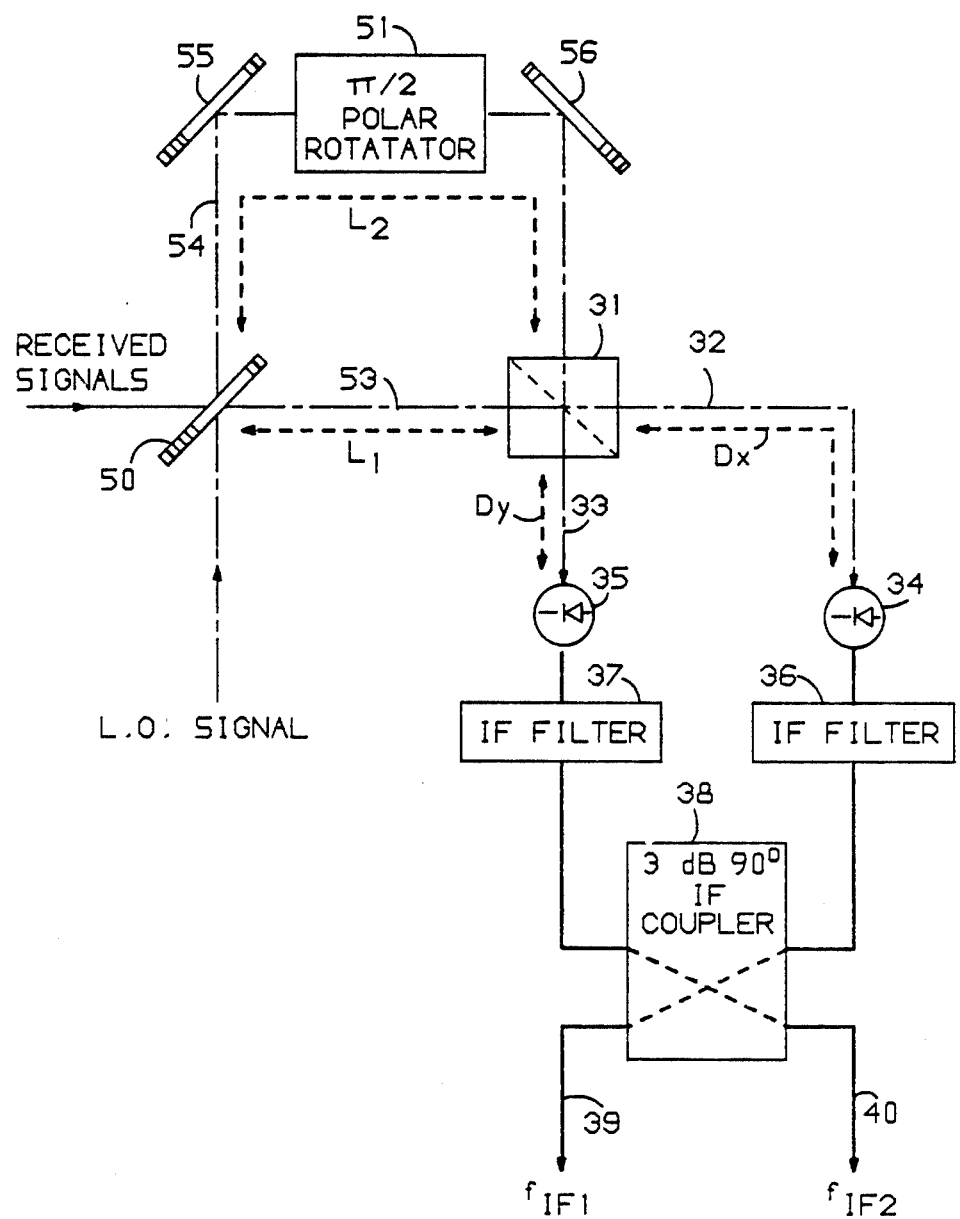
FIG. 2 is an alternative arrangement of an optical heterodyne mixer providing image-frequency rejection in accordance with the present invention.
Figure 3:
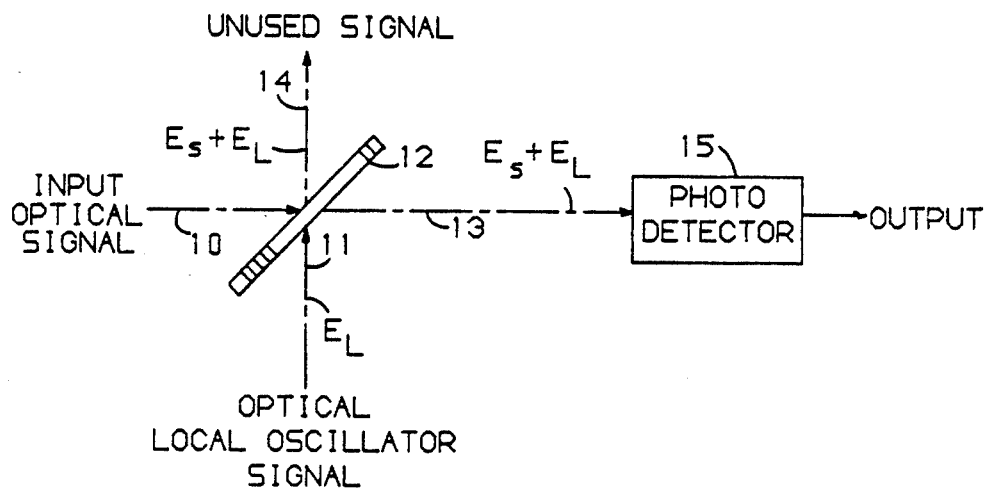
FIG. 3 is a diagram of a single-diode optical mixer known in the prior art.
Figure 4:
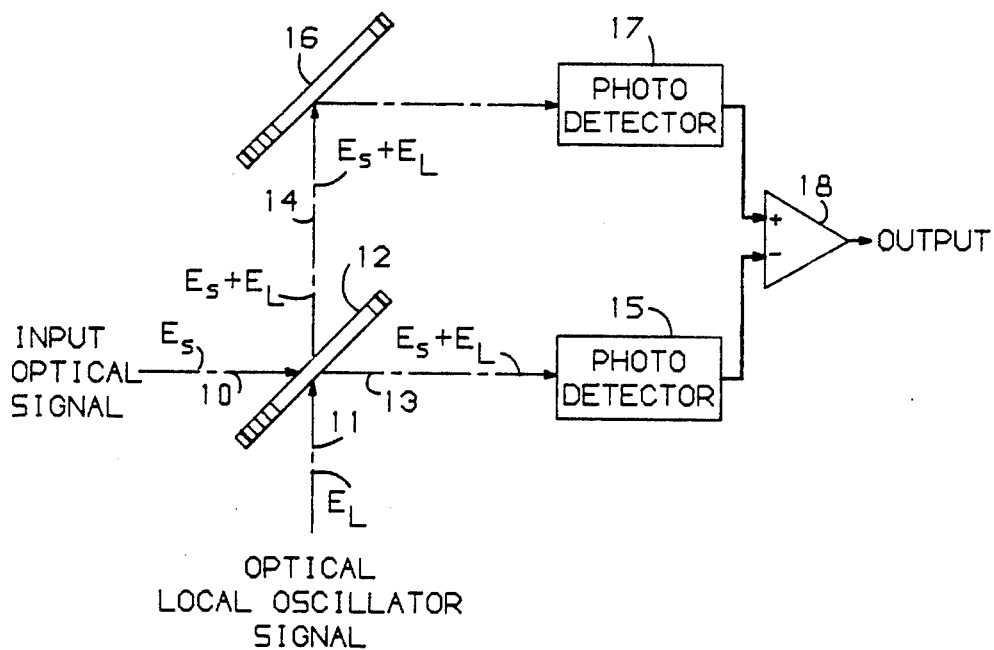
FIG. 4 is a diagram of a balanced optical mixer known in the prior art.
Figure 5:
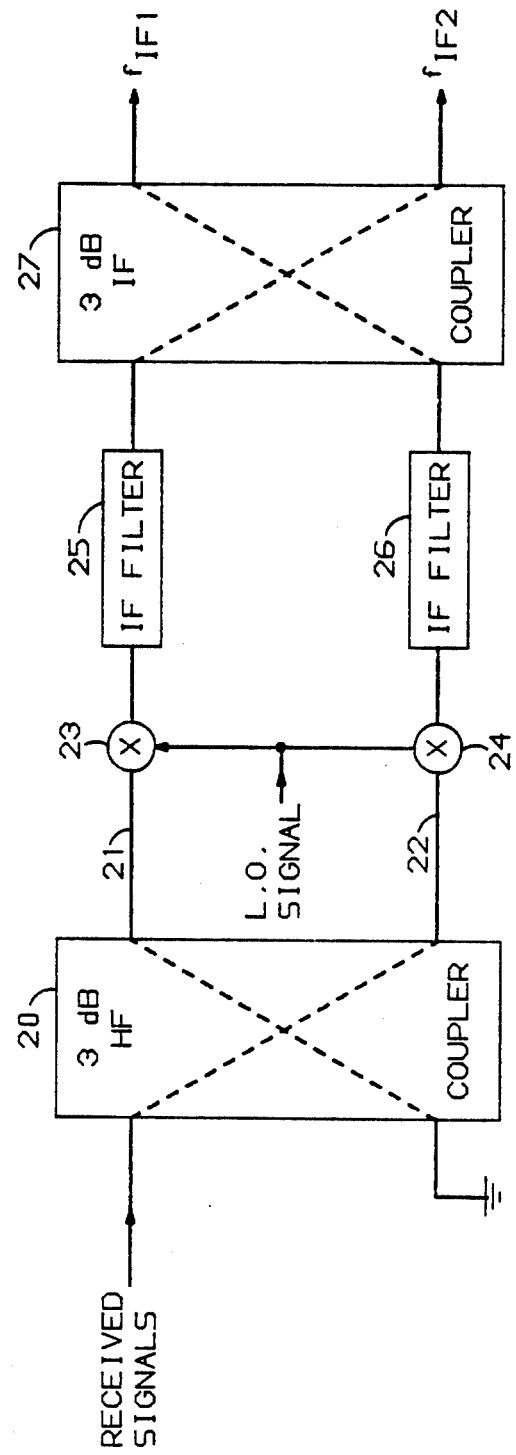
FIG. 5 is a diagram of an image rejection mixer known in the prior art for use at microwave frequencies.

In the arrangement of FIG. 1 beam splitter 30 passes most of the received signal therethrough to polarizing beam splitter 31 but reflects only a small part of the L.O. signal towards polarizing beam splitter 31. Such arrangement, therefore, uses the power supplied by the L.O. source at less than peak efficiency. The arrangement of FIG. 2 resolves this minor shortcoming of the arrangement of FIG. 1 by (a) using a 3 dB beam splitter 50 instead of a nearly transparent beam splitter 30, and (b) by adding a polarization rotator 51 in one of the paths provided by 3 dB beam splitter 50 to change the direction of polarization in the signal propagating therethrough by $\pi/2$ radians and thereby use all of the power supplied by the L.O. source. 3 dB beam splitter 50 functions to add the received and L.O. signals and transmit equal portions thereof along a first and second output path 53 and 54. For purposes of explanation and not for purposes of limitation, it will be assumed hereinafter that the polarization rotator 51 is disposed in the second output path 54 of beam splitter 50, as shown in FIG. 2, and not in the first output path 53 of beam splitter 50. If necessary, optional redirecting means 55 and 56 can be disposed in one of the two paths 53 or 54 to redirect the beam in the associated path into the appropriate direction when arriving at polarizing beam splitter 31. Optional redirecting means 55 and 56 can each comprise any suitable device such as a mirror, a prism, or a reflecting device.

For purposes of explanation and not for purposes of limitation, it will be assumed hereinafter that the beams in paths 53 and 54 arrive substantially perpendicular to each other at polarizing beam splitter 31. It is to be understood that the direction of arrival of paths 53 and 54 is dependent upon the device used for polarizing beam splitter 31 such that the function described is achieved. Polarizing beam splitter 31 functions as described hereinbefore, which is to be transparent to components in the arriving merged beams in paths 53 and 54, which include a first polarization direction that is parallel to the polarization axis of beam splitter 31 and reflects components in the arriving merged beams that include a second polarization direction which is orthogonal to the polarization axis of polarizing beam splitter 31. Since polarization rotator 51 rotates the beam in path 54 so that its polarization direction is now perpendicular to the beam propagating in path 53 when arriving at polarizing beam splitter 31, the horizontally polarized components from the beam in path 53 and the vertically polarized components from the beam in path 54 are coaxially aligned by polarizing beam splitter 31 for propagation along branch 32 and detection by photodetector 34. Similarly, the vertically polarized components of the beam propagating in path 53 and the horizontally polarized components of the beam propagating along path 54 are coaxially aligned by polarizing beam splitter 31 for propagation along branch 33 and detection by photodetector 35.

The output from photodetectors 34 and 35 and filters 36 and 37 yields two IF outputs that can be designated by $$i_1'(t) = \frac{-2\pi\eta e}{\hbar\omega} \sqrt{2P_0'P_2} \sin\left[\Omega_2 \frac{(L_2 - L_1)}{2\nu}\right] \sin\Omega_2 t' \quad (18)$$

and $$i_2'(t) = \frac{-2\pi\eta e}{\hbar\omega} \sqrt{2P_0'P_1} \sin\left[\Omega_1 \frac{(L_2 - L_1)}{2\nu}\right] \cos\Omega_1 t' \quad (19)$$

where $L_1$ and $L_2$ are the lengths of the two paths followed by the beams between 3 dB beam splitter 30 and polarizing beam splitter 31 as shown by the dashed lines in FIG. 2. Maximum signal is obtained when $L_2$ and $L_1$ are selected to satisfy the conditions $$\frac{\Omega_1(L_2 - L_1)}{2\nu} \approx \frac{\pi}{2} \quad (20)$$

and $$\frac{\Omega_2(L_2 - L_1)}{2\nu} \approx \frac{\pi}{2} \quad (21)$$

This can be achieved if the two IF frequencies are close enough. In this case, the IF signal powers of Equations (18) and (19) become proportional to the entire power $P_o$, supplied by the L.O. source instead of the fraction $P_o$ previously available. As a result, an L.O. source of lower power is required to achieve quantum noise-limited performance.

From the foregoing discussion it can be seen that in the present arrangement the use of a linear polarization for one of the two input signals and a circular polarization for the other of the two input signals, and the immediate combination of the two input signals in beam splitter 30 permits both signals to propagate along the same path to polarizing beam splitter 31. Such arrangement avoids optical path length changes for any one of the two input signals relative to the other input signal when propagating to the input of polarizing beam splitter 31. Then, the use of a polarizing beam splitter 31 oriented with its polarization axis at 45 degrees relative to the orientation of the linearly polarized input signal, and the common path being used for the two merged input signals to the input of the polarizing beam splitter, permits proper amplitudes and phases of the polarization components and the outputs of polarizing beam splitter 31 to be obtained. Because of such arrangement, any path length differences occurring between polarizing beam splitter 31 and each of photodetectors 34 and 35 produces only a negligible effect in the output of the two photodetectors because any phase error that may be produced is only proportional to the IF frequency and not to the optical frequency of the received signals. Therefore, the present heterodyne mixers are insensitive to any fluctuations in the optical dimensions of the circuit. It is to be understood, however, that the use of linear and circular polarizations for the L. O. and received input signals is preferred, but that any other polarization combinations in the two input signals which will provide the same phase and amplitude relationships at the photodetector levels will provide the same image rejection performance and also be insensitive to optical dimensions of the circuit.

It is to be understood that the above-described embodiments are simply illustrative of the principles of the invention. Various other modifications and changes may be made by those skilled in the art which will embody the principles of the invention and fall within the spirit and scope thereof. For example, in FIG. 2, 3 dB beam splitter 50 can comprise any suitable device such as, for example, an optical coupling device which will merge the received and L.O. signals and then the divide the merged beam into substantially equal output signals. Similarly, the $\pi/2$ polarization rotator 51 can be included in path 53 rather than in path 54. With this latter arrangement, the signals normally received by photodetector 34 in the arrangement shown in FIG. 2 would be received by photodetector 35 and vice versa, with associated results at the output of IF coupler 38.

What is claimed is:

1. An optical heterodyne mixer for providing image-frequency rejection comprising:
   a first input terminal for receiving an optical local oscillator input signal and including a first predetermined polarization and a second input terminal for receiving an optical information input signal at a predetermined frequency above or below the local oscillator signal and including a second predetermined polarization, which is different than the first polarization;
   means for merging the input signals received at the first and second input terminals and generating an optical output signal representative of the two merged input signals for propagation along a common path to avoid any phase or amplitude changes between the two merged signals;
   means for directing (a) components of the merged signals including a first polarization direction into a first branch, and (b) components of the merged signals including a second polarization direction, orthogonal to the first polarization direction, into a second branch, the directing means comprising a polarization axis which is oriented such that (1) the two components of a first one of the two merged input signals at the input to the directing means are disposed relative to the polarization axis of the directing means to provide output signals in the first and second branches which include the same amplitude and phase, and (2) the two components of a second one of the two merged signals at the input to the directing means are disposed relative to the polarization axis of the directing means to provide output signals in the first and second branches which include the same amplitude and be in phase quadrature, to provide output signals at the directing means which are insensitive to fluctuations in the optical dimensions of the mixer;
   first and second optical detecting means disposed in the first and second branches, respectively, for detecting the associated optical signal from the directing means and generating respective first and second Intermediate Frequency (IF) electrical output signals; and
   coupling means for adding the first and second IF output signals and generating (a) a desired IF signal at a first output thereof and (b) an IF signal at the image frequency of the desired IF signal at a second output thereof.

2. An optical heterodyne mixer according to claim 1 wherein
   the first one of the merged polarized first and second input signals at the output of the merging means comprises a linear polarization which is oriented at 45 degrees to the polarization axes of the directing means, and the second one of the merged first and second input signals at the output of the merging means comprises a circular polarization.

3. An optical heterodyne mixer according to claim 1 or 2 wherein
   the receiving and directing means comprises a polarizing beam splitter.

4. An optical heterodyne mixer according to claim 1 or 2 wherein
   the merging means comprises an optical beam splitter.

5. An optical heterodyne mixer according to claim 4 wherein
   the merging means is capable of generating a second output signal for propagation along a second output path, each of the first and second output signals including substantially equal components of the merged received and local oscillator signals, and the first and second output paths are terminated at separate inputs to the receiving and directing means; and
   means disposed in either one of the first and second output paths of the merging means for rotating the polarization direction of the signal passing therethrough by $\pi/2$ radians.

6. An optical heterodyne mixer according to claim 1 or 2 wherein
   the merging means is capable of generating a second output signal for propagation along a second output path, each of the first and second output signals including substantially equal components of the merged received and local oscillator signals, and the first and second output paths are terminated at separate inputs to the receiving and directing means; and
   means disposed in either one of the first and second output paths of the merging means for rotating the polarization direction of the signal passing therethrough by $\pi/2$ radians.

7. An optical heterodyne mixer according to claim 3 wherein
   the merging means comprises an optical beam splitter.

8. An optical heterodyne mixer according to claim 3 wherein
   the merging means is capable of generating a second output signal for propagation along a second output path, each of the first and second output signals including substantially equal components of the merged received and local oscillator signals, and the first and second output paths are terminated at separate inputs to the receiving and directing means; and
   means disposed in either one of the first and second output paths of the merging means for rotating the polarization direction of the signal passing therethrough by $\pi/2$ radians.

* * * * *